United States Patent
Ichikawa et al.

(10) Patent No.: US 9,441,105 B2
(45) Date of Patent: Sep. 13, 2016

(54) BIODEGRADABLE RESIN COMPOSITION, AND BIODEGRADABLE FILM

(71) Applicant: SHOWA DENKO K.K., Minato-ku, Tokyo (JP)

(72) Inventors: Yasushi Ichikawa, Tokyo (JP); Hideharu Kimura, Tokyo (JP); Yuuki Tetsuka, Tochigi (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/357,951

(22) PCT Filed: Nov. 5, 2012

(86) PCT No.: PCT/JP2012/078652
§ 371 (c)(1),
(2) Date: May 13, 2014

(87) PCT Pub. No.: WO2013/073402
PCT Pub. Date: May 23, 2013

(65) Prior Publication Data
US 2014/0336310 A1 Nov. 13, 2014

(30) Foreign Application Priority Data
Nov. 15, 2011 (JP) ................................ 2011-250035

(51) Int. Cl.
C08L 3/10 (2006.01)
C08L 67/02 (2006.01)
C08L 3/02 (2006.01)
C08J 5/18 (2006.01)

(52) U.S. Cl.
CPC ........ *C08L 67/02* (2013.01); *C08J 5/18* (2013.01); *C08L 3/02* (2013.01); *C08L 3/10* (2013.01); C08J 2300/16 (2013.01); C08J 2367/04 (2013.01)

(58) Field of Classification Search
CPC ............. C08L 67/02; C08L 3/02; C08J 5/18; C08J 2300/16; C08J 2367/04
See application file for complete search history.

(56) References Cited

U.S. PATENT DOCUMENTS 6,184,261 B1 * 2/2001 Biby et al. ............. C08J 9/0061
521/138
7,846,987 B2 * 12/2010 Handa ..................... C08J 9/142
521/56

2010/0093890 A1 4/2010 Ataka et al.
2012/0016328 A1 * 1/2012 Shi et al. .................. 604/385.01

FOREIGN PATENT DOCUMENTS

| CN | 101386703 A | 3/2009 |
|---|---|---|
| EP | 1 837 363 A1 | 9/2007 |
| JP | 1-217002 A | 8/1989 |
| JP | 2-14228 A | 1/1990 |
| JP | 3-56543 A | 3/1991 |
| JP | 3-70752 A | 3/1991 |
| JP | 3-74445 A | 3/1991 |
| JP | 3-74446 A | 3/1991 |
| JP | 5-271377 A | 10/1993 |
| JP | 6-170941 A | 6/1994 |
| JP | 8-239402 A | 9/1996 |
| JP | 9-31308 A | 2/1997 |
| JP | 2939586 B1 | 8/1999 |
| JP | 3078478 B2 | 8/2000 |
| JP | 2004-131726 A | 4/2004 |
| JP | 2004-147613 A | 5/2004 |
| JP | 2007-277353 A | 10/2007 |
| JP | 2008-13602 A | 1/2008 |
| JP | 2008-24764 A | 2/2008 |
| JP | 2009-167370 A | 7/2009 |
| JP | 2011-74114 A | 4/2011 |
| WO | 2008/133200 A1 | 11/2008 |

OTHER PUBLICATIONS

Extended European Search Report dated Jun. 1, 2015, issued for counterpart Application No. 12848793.1, 5 pages.
Bin Yang, "Green plastic polylactic acid", Chemical Industry Press, 1st edition, 2007, pp. 4-8 (7 pgs. total).
Xianwen KE, "Functional packaging material", Chemical Industry Press, 1st edition, 2004, pp. 119-120 (4 pgs. total).
Jin Huang et al., "Biomass chemical engineering and biomass materials", Chemical Industry Press, 1st edition, 2009, pp. 163-167 (7 pgs. total).
Communication dated Jan. 21, 2016, issued by the State Intellectual Property Office of the P.R.C. in corresponding Chinese Application No. 201280054591.X.

* cited by examiner

*Primary Examiner* — Kriellion Sanders
(74) *Attorney, Agent, or Firm* — Sughrue Mion, PLLC

(57) ABSTRACT

There are disclosed a biodegradable resin composition including a starch (a1), a biodegradable resin (a2) other than a polylactic acid-based polymer and a non-crystalline polylactic acid-based polymer (b), a mass ratio of the starch (a1) to the biodegradable resin (a2) other than a polylactic acid-based polymer (a1/a2) being from 20/80 to 50/50, and a mass ratio of a sum of the components other than the polymer (b) to the polymer (b) (sum of components other than polymer (b)/polymer (b)) being from 95/5 to 50/50, and a biodegradable film using the biodegradable resin composition.

10 Claims, No Drawings

BIODEGRADABLE RESIN COMPOSITION, AND BIODEGRADABLE FILM

CROSS REFERENCE TO RELATED APPLICATIONS

This application is a National Stage of International Application No. PCT/JP2012/078652, filed on Nov. 5, 2012 (which claims priority from Japanese Patent Application No. 2011-250035, filed on Nov. 15, 2011), the contents of which are incorporated herein by reference in their entirety.

TECHNICAL FIELD

The present invention relates to a biodegradable resin composition and a biodegradable film using the biodegradable resin composition, and more particularly, to a biodegradable resin composition that is not only improved in moldability and mechanical properties such as tear strength and impact strength, but also excellent in bag-making suitability such as heat-sealing property and economy, and exhibits an adequate biodegradation rate, and a biodegradable film using the biodegradable resin composition which can be suitably used as a composting bag, an agricultural film and a packaging material, etc.

BACKGROUND ART

It is known that biodegradable resins are readily susceptible to degradation in water and soil without producing harmful substances. In consequence, the biodegradable resins have been worldwide noticed from the viewpoint of environmental protection such as waste disposal treatments. Among them, biodegradable resins other than polylactic acid-based polymers exhibit physical properties close to polyethylene. Therefore, it is expected that a film obtained by molding such biodegradable resins will be used in the applications such as agricultural materials, civil engineering materials, vegetation materials and packaging materials in future (for example, refer to Patent Documents 1 and 2).

However, any of the conventional biodegradable films is insufficient in tear strength, in particular, in a machine direction (stretch direction) of the films, and therefore have problems upon practical use.

On the other hand, construction of a recycling-oriented society by change from exhaustible resources to recyclable resources has been noticed. For this reason, as a raw material of the films, there is an increasing interest in not synthetic materials produced from petroleum but materials derived from natural substances. At present, as the materials derived from natural substances, starches have been practically used.

As the starches imparted with film-forming property and physical properties, there have been proposed an esterified vinyl ester graft polymerized starch (Patent Document 3), starch esters (Patent Document 4), and an alloy of a polyester graft-polymerized starch and a polyester (Patent Document 5). Further, it might be considered that by highly modifying starches, the resulting modified starches are further enhanced in film-forming property and physical properties. However, such modification of the starches is unpractical in view of costs.

Also, there has been proposed the method of preparing a composite material of a gelatinized starch and a thermoplastic resin (for example, refer to Patent Documents 6 and 7). Further, there have been various proposals concerning systems to which modified starches are added (for example, refer to Patent Documents 8 to 11).

However, any of these conventional compositions tends to be insufficient in fluidity upon heat-melting. Therefore, although it is possible to some extent to form the compositions into a molded article having a simple shape, e.g., a thick sheet, etc., by an extrusion-molding method, it has been difficult to obtain a molded article having a complicated shape, e.g., a thin film therefrom, by an injection-molding method. Even if the thin film is formed from the compositions, the resulting film tends to fail to have practical physical properties. In addition, since it is required to conduct a gelatinization step and a blending step of the starches separately from each other, there tend to arise the problems concerning production costs.

To solve these problems, there has been proposed the method of providing a composition of an oxidized gelatinized starch and a biodegradable resin (Patent Document 12). In this method in which the gelatinization and oxidation steps are conducted at the same time, since the gelatinization step is carried out in the presence of water and a plasticizer, it tends to be difficult to control decomposition of the starch by an oxidizing agent or blend the aforementioned water, plasticizer, oxidizing agent and resin with each other to a sufficient extent, and therefore there tends to arise such a problem that production costs are virtually increased. More specifically, when the gelatinization, oxidation and compounding steps are conducted at the same time, the resulting biodegradable resin tends to have a reduced molecular weight, and therefore it is difficult to enhance a film-forming property and physical properties of the resin composition.

As illustrated, in the case where the oxidized gelatinized starch pellets and the biodegradable resin pellets are dry-blended with each other upon molding, the blended resin mixture may be subjected to injection molding without any significant problem. However, if the resin mixture is formed into a thin film using a melting extruder ordinarily used in an inflation molding method, kneading of the resin mixture tends to be insufficient, so that there tend to be caused the problems concerning a moldability and physical properties of the resulting resin composition. In addition, in Patent Document 12, since a peroxide is used as the oxidizing agent, the gelatinized starch and the biodegradable resin tend to be insufficient in compatibility therebetween, so that the obtained resin composition may fail to be sufficiently improved in moldability when forming the composition into a film.

In the Patent Documents 13 to 15 cited herein, there are disclosed resin compositions constituted of an oxidized starch and a biodegradable resin which are improved in moldability and mechanical properties, as well as physical properties of compositions obtained by further adding additives and an aliphatic aromatic polyester to the resin compositions. However, any of the above conventional methods fails to improve a film-forming property of the resin compositions and a heat-sealing property of the obtained films when adding a lactic acid-based polymer essentially having a high melting point to the compositions.

CITATION LIST

Patent Literature

Patent Document 1: JP 5-271377A
Patent Document 2: JP 6-170941A
Patent Document 3: JP 8-239402A
Patent Document 4: JP 2939586
Patent Document 5: JP 9-31308A
Patent Document 6: JP 1-217002A Patent Document 7: JP 2-14228A
Patent Document 8: JP 3-56543A
Patent Document 9: JP 3-70752A
Patent Document 10: JP 3-74445A
Patent Document 11: JP 3-74446A
Patent Document 12: JP 3078478
Patent Document 13: JP 2007-277353A
Patent Document 14: JP 2008-013602A
Patent Document 15: JP 2008-024764A

SUMMARY OF THE INVENTION

Problems to be Solved by the Invention

The present invention has been made to solve the above conventional problems. An object of the present invention is to provide a biodegradable resin composition that is not only improved in moldability and mechanical properties such as tear strength, but also excellent in bag-making suitability such as heat-sealing property and economy, and exhibits an adequate biodegradation rate, and a biodegradable film using the biodegradable resin composition.

Means for Solving the Problems

As a result of extensive and intensive researches for solving the above problems, the present inventors have found that when adding a non-crystalline polylactic acid-based polymer to a composition containing a starch and a biodegradable resin other than a polylactic acid-based polymer, the above problems can be solved. The present invention has been accomplished on the basis of the above finding.

That is, the present invention relates to the following aspects (1) to (10).
(1) A biodegradable resin composition including a starch (a1), a biodegradable resin (a2) other than a polylactic acid-based polymer and a non-crystalline polylactic acid-based polymer (b), a mass ratio of the starch (a1) to the biodegradable resin (a2) other than a polylactic acid-based polymer (a1/a2) being from 20/80 to 50/50, and a mass ratio of a sum of the components other than the polymer (b) to the polymer (b) (sum of components other than polymer (b)/polymer (b)) being from 95/5 to 50/50.
(2) The biodegradable resin composition as described in the above aspect (1), wherein the starch is an oxidized starch having a structure represented by the general formula (I):

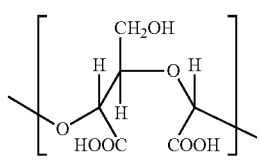

(3) The biodegradable resin composition as described in the above aspect (1) or (2), wherein the biodegradable resin (a2) is a condensation polymer of ethylene glycol and/or 1,4-butanediol, and succinic acid and/or adipic acid.
(4) The biodegradable resin composition as described in any one of the above aspects (1) to (3), wherein the non-crystalline polylactic acid-based polymer (b) is a polymer of L-lactic acid and D-lactic acid, and a content of the L-lactic acid and a content of the D-lactic acid in the polymer are respectively 94 mol % or less.
(5) The biodegradable resin composition as described in any one of the above aspects (1) to (4), wherein the starch (a1) is an oxidized starch produced by using sodium hypochlorite.
(6) The biodegradable resin composition as described in any one of the above aspects (1) to (5), further including a high-boiling point solvent.
(7) The biodegradable resin composition as described in any one of the above aspects (1) to (6), further including a plasticizer.
(8) The biodegradable resin composition as described in the above aspect (7), wherein the plasticizer is at least one compound selected from the group consisting of polyglycerin acetic acid ester and derivatives thereof, and adipic acid diesters.
(9) The biodegradable resin composition as described in any one of the above aspects (1) to (8), wherein the biodegradable resin composition is produced by melt-kneading the components other than the polymer (b) in a vented extruder, and then adding the polymer (b) to the components thus kneaded.
(10) A biodegradable film including the biodegradable resin composition as described in any one of the above aspects (1) to (9).

Advantageous Effect of the Invention

According to the present invention, there are provided a biodegradable resin composition that is not only improved in moldability and mechanical properties such as tear strength, but also excellent in bag-making suitability such as heat-sealing property and economy, and exhibits an adequate biodegradation rate, and a biodegradable film using the biodegradable resin composition.

The biodegradable film according to the present invention can exhibit good mechanical properties, in particular, a high tear strength in a machine direction (stretch direction) thereof and therefore can be suitably used as a composting bag, an agricultural film and a packaging material, etc., and further is excellent in economy and flexibility.

DESCRIPTION OF EMBODIMENTS

[Biodegradable Resin Composition]

The biodegradable resin composition according to the present invention contains a starch (a1), a biodegradable resin (a2) other than a polylactic acid-based polymer and a non-crystalline polylactic acid-based polymer (b) at specific proportions. The components other than the polymer (b) are hereinafter collectively referred to as a component (A). However, the order of addition of these components upon compounding is not particularly limited, and the components other than the starch (a1), the biodegradable resin (a2) other than a polylactic acid-based polymer and the non-crystalline polylactic acid-based polymer (b) may be added upon compounding the polymer (b) or may be preliminarily added upon compounding the starch (a1) and the biodegradable resin (a2) other than a polylactic acid-based polymer. The biodegradable resin composition according to the present invention contains the composition (A) containing the starch (a1) and the biodegradable resin (a2) other than a polylactic acid-based polymer at specific proportions, and the non-crystalline polylactic acid-based polymer (b) such that a mass ratio of the composition (A) to the polymer (b) (A/b) is from 95/5 to 50/50. The biodegradable resin composition according to the present invention is improved in mechanical properties and excellent in heat-sealing property and economy and further exhibits an adequate biodegradation rate, and therefore can be suitably used as a biodegradable film. In the following, the biodegradable resin composition according to the present invention is described in more detail.

[Composition (A)]

(Starch (a1))

The starch (a1) that may be used in the present invention is not particularly limited. Examples of the starch (a1) include unmodified starches such as potato starch, corn starch, sweet potato starch, tapioca starch, sago starch, rice starch and wheat starch; and modified starches such as various esterified starches, etherified starches and oxidized starches. Of these starches, preferred are oxidized starches. The oxidized starches are preferably in the form of a gelatinized oxidized starch that is produced by using sodium hypochlorite.

In the case where the gelatinized oxidized starch is used as the starch (a1), the resulting biodegradable resin composition can exhibit a good moldability when forming the composition into a film, and the biodegradable film obtained from the composition can be improved in physical properties.

In order to obtain the gelatinized oxidized starch, the raw oxidized starch is subjected to a treatment for forming the structure represented by the following general formula (I), i.e., such a treatment in which the bond between carbon atoms C-2 and C-3 in a glucose unit of a part of the starch is broken to form carboxyl groups constituted of the carbon atoms C-2 and C-3, respectively.

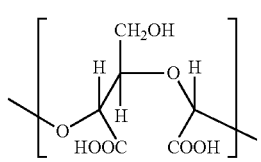

(I)

As the method of converting the glucose unit in the starch into the structure represented by the above general formula (I), there may be mentioned, for example, a method of oxidizing the starch with a hypochlorite such as sodium hypochlorite, a bleaching powder, hydrogen peroxide, potassium permanganate, ozone or the like.

Meanwhile, in the case where the starch is oxidized with an oxidizing agent such as a peroxide, the starch tends to be depolymerized owing to break of a glycoside bond therein, so that the break of the bond between the carbon atoms C-2 and C-3 tends to be hardly caused to a sufficient extent, and the amount of the carboxyl groups produced tends to be reduced.

The oxidation of the starch with sodium hypochlorite, etc., may be preformed, for example, by the method in which after adjusting a pH value of a water suspension of the starch having a starch concentration of from about 40 to about 50% by mass, preferably about 45% by mass, to the range of from about 8 to about 11, an aqueous sodium hypochlorite solution having a chlorine concentration of from about 8 to about 12% by mass, preferably about 10% by mass, is added to the water suspension to conduct a reaction therebetween at a temperature of from about 40 to about 50° C. for about 1 h to about 2 h. The reaction is preferably conducted in an anticorrosion reactor under normal pressures while stirring.

After completion of the reaction, the aimed product is separated using a centrifugal dehydrator, etc., fully washed with water and then dried.

The amount of the carboxyl groups in the starch (a1) can be expressed by a degree of substitution of carboxyl groups (neutralization titration method), and the degree of substitution of carboxyl groups in the starch (a1) is preferably from 0.001 to 0.100 and more preferably from 0.010 to 0.035.

The oxidized starch may be a commercially available product. Examples of the commercially available product of the oxidized starch include "AcE-A" and "AcE-C" both available from Oji Cornstarch Co., Ltd., and the like.

Meanwhile, the method of oxidizing the starch with sodium hypochlorite is described, for example, in "Starch Science Dictionary" (Eiji Fuwa, Asakura Publishing Co., Ltd., Mar. 20, 2003, p. 403) and "Starch Science Handbook" (Jiro Nikuni, Asakura Publishing Co., Ltd., Jul. 20, 1977, p. 501), or the like.

(Biodegradable Resin (a2))

The biodegradable resin (a2) used in the present invention is not particularly limited as long as it is a biodegradable resin other than a polylactic acid-based polymer.

Meanwhile, the "polylactic acid-based polymer" used in the present specification means a polymer containing L-lactic acid and/or D-lactic acid as constitutional units in an amount of 50 mol % or more.

Also, the "crystalline polylactic acid-based polymer" used in the present specification means a polylactic acid-based polymer having a peak of a melting point in a temperature range of 130° C. or higher as measured by melting the polymer at 190° C. by DSC and cooing the molten polymer to 20° C. at a temperature drop rate of 10° C./min, and further heating the polymer at a temperature rise rate of 10° C./min.

More specifically, the biodegradable resin may be a resin constituted of a condensation polymer of an aliphatic polycarboxylic acid or an anhydride thereof and an aliphatic polyol or an anhydride thereof, or a polymer of a hydroxylcarboxylic acid, and is preferably a thermoplastic resin in view of a good moldability. The biodegradable resin may also be any resin belonging to chemically synthesized resins, microorganism-based resins (microbiologically produced resins), natural substance-derived resins and the like.

Examples of the biodegradable resin include polybutylene succinate, polybutylene succinate-adipate, polyethylene succinate, polycaprolactone as a self-condensed polymer of oxycaproic acid, a polyhydroxybutyrate/valerate copolymer or the like. These biodegradable resins may be used alone or in combination of any two or more thereof.

Of these biodegradable resins, from the viewpoints of good film-forming property, physical properties and availability, preferred are chemically synthesized aliphatic polyesters. Further, from the viewpoint of producing a good molded article, of these aliphatic polyesters, more preferred are those aliphatic polyesters having a melting point of from 50 to 180° C. and a mass-average molecular weight of 50,000 or more which may be usually obtained by subjecting a polyol and an aliphatic polycarboxylic acid to dehydration co-condensation.

Meanwhile, the term "mass-average molecular weight" as used in the present specification means the value measured under the following conditions using the following apparatus.

GPC Apparatus: "Shodex GPC SYSTEM-11" (available from Showa Denko K.K.);

Eluent: $CF_3COONa$, 5 mM/HFIP (hexafluoroisopropanol);
Sampling Column: "HFIP-800P" and "HFIP-80M"×2;
Reference Column: "HFIP-800R"×2;
Polymer Solution: 0.1% by weight HFIP solution, 200 μL;
Column Temperature: 40° C., flow rate: 1.0 mL/min;
Pressure: 30 kg/cm$^2$;
Detector: "Shodex RI";
Molecular Weight Standard: PMMA ("Shodex STANFARD M-75").

MFR (melt flow rate) is measured at a temperature of 190° C. under a load of 2.16 kg according to JIS-K-7210.

Examples of the polyol include ethylene glycol, 1,4-butanediol, 1,6-hexanediol, decamethylene glycol and neopentyl glycol. Examples of the aliphatic polycarboxylic acid include succinic acid, adipic acid, suberic acid, sebacic acid, dodecanedioic acid, and anhydrides of these acids.

In the present invention, as the biodegradable resin, there is preferably used a condensation polymer of ethylene glycol and/or 1,4-butanediol, and succinic acid and/or adipic acid.

In addition, the biodegradable resin may also contain, as the other comonomer component, a small amount of a trifunctional or tetrafunctional polyol, an oxycarboxylic acid or a polycarboxylic acid.

As the commercially available product of the aliphatic polyesters, there are well known and preferably used, for example, "Bionolle" series available from Showa Denko K.K. Further, as the commercially available product of the polycaprolactone, there may be mentioned "PCLH" series available from Daicel Corp., such as "PCLH-7".

(Mass Ratio between Starch (a1) and Biodegradable Resin (a2))

The composition (A) used in the present invention contains the starch (a1) and the biodegradable resin (a2) at a mass ratio (a1/a2) of from 20/80 to 50/50. When the content of the starch (a1) in the composition (A) is less than 20, the resulting biodegradable resin composition tends to be deteriorated in biodegradability, resulting in increase in production costs. On the other hand, when the content of the starch (a1) in the composition (A) is more than 50, the resulting biodegradable film tends to be deteriorated in physical properties such as mechanical properties. In the present invention, the mass ratio (a1/a2) is preferably from 30/70 to 50/50, more preferably from 40/60 to 50/50, still more preferably from 42/58 to 50/50 and further still more preferably from 45/55 to 50/50.

Meanwhile, the total content of the starch (a1) and the biodegradable resin (a2) in the composition (A) is preferably from 70 to 100% by mass, more preferably from 80 to 100% by mass, and still more preferably from 90 to 100% by mass.

Even in the case where the gelatinized oxidized starch is used as the starch (a1), it is preferred that the starch (a1) and the biodegradable resin (a2) are mixed at the above specified mass ratio from the viewpoints of a good moldability upon forming the composition into a film as well as good physical properties of the resulting biodegradable film.

The composition (A) may also contain a crystalline polylactic acid-based polymer in addition to the starch (a1) and the biodegradable resin (a2). The content of the crystalline polylactic acid-based polymer in the composition (A) is preferably 10% by mass or less, more preferably 5% by mass or less and still more preferably 2% by mass or less.

In addition, the composition (A) may also contain a solvent such as water, a plasticizer or the like as described below.

(Solvent)

In the present invention, a solvent such as water may be used if required. In particular, as the solvent, there is preferably used a high-boiling point polar solvent.

Meanwhile, the term "high-boiling point" as used in the present specification means a boiling point of 180° C. or higher as measured at 1 atm.

Examples of the high-boiling point polar solvent include ethylene glycol, propylene glycol, glycerin, sorbitol, polyethylene glycol and polypropylene glycol. Of these high-boiling point polar solvents, glycerin is preferred from the viewpoint of good balance between compatibility with the gelatinized oxidized starch and the biodegradable resin, gelatinizing capability and costs. These solvents such as water may be used alone or in combination of any two or more thereof.

The solvent such as water, if added, is preferably compounded in the composition (A) in an amount of from 2 to 20% by mass, more preferably from 2 to 18% by mass and still more preferably from 2 to 13% by mass.

When the amount of water as the solvent to be compounded is adjusted to the above-specified range, the resulting composition can be readily kneaded and can be prevented from suffering from deterioration in mechanical properties and moldability.

(Plasticizer)

In the present invention, the composition (A) may also contain a plasticizer in view of forming the biodegradable resin composition into a film. In particular, the addition of the plasticizer to the composition (A) is preferred when the biodegradable resin (a2) further contains a polylactic acid-based polymer, because the plasticizer can exhibit excellent effects in the resulting biodegradable film, more specifically, the resulting biodegradable film can be enhanced in mechanical properties such as tear strength and impact resistance.

As the plasticizer, preferred are glycerin derivatives, and more preferred are polyglycerin acetic acid esters or derivatives thereof, and adipic acid diesters.

The amount of the plasticizer compounded in the composition (A) is preferably from 1 to 10% by mass and more preferably from 2 to 8% by mass. When the amount of the plasticizer added is adjusted to 1% by mass or more, the resulting film can be improved in film properties, in particular, tensile elongation and impact strength. When the amount of the plasticizer added is adjusted to 10% by mass or less, the resulting film is free from defective appearance owing to bleeding of the plasticizer.

(Method for Producing Composition (A))

The composition (A) contained in the biodegradable resin composition according to the present invention is preferably produced by the method using an extruder ordinarily used for melt-mixing a thermoplastic resin.

In the following, an example of the method for producing the composition (A) in which gelatinization of an oxidized starch as the starch (a1) and melt-mixing of the oxidized starch and the biodegradable resin (a2) are simultaneously conducted, is explained.

First, in order to simultaneously conduct gelatinization of the oxidized starch, dehydration and melt-mixing of the gelatinized oxidized starch (a1) and the biodegradable resin (a2), it is important that the apparatus used therein is an extruder of a twin-screw type equipped with a vent for the dehydration.

In addition, in order to ensure a sufficient production output, a screw L/D ratio of the extruder is an important factor, and is preferably 32 or more. Meanwhile, the "screw L/D ratio" as used in the present specification means a ratio of an effective length (L) of the screw to a diameter (D) of the screw.

As the method of efficiently conducting the dehydration and mixing, there may be mentioned such a method including a first step of conducting deaeration for removal of gases, water, etc., from an extruder through a vent of an open type upon completion of gelatinization of the oxidized starch by heating and mixing to prevent occurrence of a back flow within the extruder owing to increase in an inside pressure of the extruder, and a second step of further continuously mixing the gelatinized oxidized starch with the biodegradable resin other than a polylactic acid-based polymer to conduct dehydration thereof through a vacuum vent. Meanwhile, in the present specification, the "first step" means a step of conducting melting of the biodegradable resin other than a polylactic acid-based polymer and gelatinization of the starch, and the "second step" means a step of conducting mixing of the biodegradable resin other than a polylactic acid-based polymer with the gelatinized starch and deaeration for removal of water.

In order to complete the above two steps using only one extruder, it is required that the screw L/D ratio of the extruder is at least 32. By using an apparatus having a larger screw L/D ratio, it is possible to increase an output thereof and therefore reduce production costs.

In the first step, the temperature is set within the range of from 60 to 150° C. and preferably from 80 to 140° C. corresponding to a softening temperature (or melting point) of the biodegradable resin (a2). Many of the biodegradable resins (a2) are capable of being softened (melted) in the above temperature range, so that the gelatinization of the oxidized starch can be carried out simultaneously with the mixing of the gelatinized oxidized starch with the biodegradable resin.

The residence time in the first step is preferably from 30 to 180 s and more preferably from 60 to 120 s. When the residence time in the first step is 30 s or longer, it is possible to allow the gelatinization of the oxidized starch to sufficiently proceed. When the residence time in the first step is 180 s or shorter, it is possible to suppress decomposition of the respective components and ensure a good productivity.

In the second step, the temperature is set within the range of from 130 to 180° C. and preferably from 150 to 170° C. By setting the temperature of the second step in the above specified range, it is possible to completely melt and mix the gelatinized oxidized starch and the biodegradable resin.

The residence time in the second step is preferably from 30 to 120 s and more preferably from 60 to 90 s. When the residence time in the second step is 30 s or longer, it is possible to sufficiently mix the gelatinized oxidized starch with the biodegradable resin. When the residence time in the second step is 120 s or shorter, it is possible to suppress decomposition of the respective components and ensure a good productivity.

The above procedure is conducted to obtain the composition (A). Even when the unmodified starch described above is used instead of the oxidized starch, the gelatinization of such an unmodified starch and the melt-mixing of the biodegradable resin therewith may be conducted under the same conditions as described above.

The thus obtained composition (A) is then dried by heating the composition at a temperature that is set corresponding to the softening point (or melting point) of the biodegradable resin (a2) in an oven for about 24 h while flowing dried air therethrough. The temperature is preferably set to the range of from 50 to 110° C. and more preferably from 60 to 100° C. In this stage, the content of water in the composition (A) which includes the water added and the water contained in the starch is reduced to about 0.4% by mass or less. However, the content of water in the composition (A) if any is not particularly limited thereto. The content of water in the composition (A) may be 1.0% by mass or less, and is preferably 0.5% by mass or less and more preferably 0.3% by mass or less.

In the present invention, the mass ratio (a1)/(a2) in the composition (A) after dried is preferably from 25/75 to 50/50, more preferably from 30/70 to 50/50, still more preferably from 35/65 to 50/50 and further still more preferably from 40/60 to 50/50.

<Non-Crystalline Polylactic Acid-Based Polymer (b)>

The non-crystalline polylactic acid-based polymer used in the present invention is a polylactic acid-based polymer having no peak of a melting point in a temperature range of 130° C. or higher as measured by melting the polymer at 190° C. by DSC and cooing the molten polymer to 20° C. at a temperature drop rate of 10° C./min, and further heating the polymer at a temperature rise rate of 10° C./min. The non-crystalline polylactic acid-based polymer is not particularly limited as long as it can satisfy the above requirement.

Examples of the non-crystalline polylactic acid-based polymer (b) that can satisfy such a requirement, include copolymers containing both L-lactic acid and D-lactic acid as constitutional units.

As the polymerization method for producing the non-crystalline polylactic acid-based polymer (b), there may be used conventionally known methods such as a polycondensation method and a ring opening polymerization method. For example, in the polycondensation method, L-lactic acid or D-lactic acid, or a mixture thereof is directly subjected to dehydration polycondensation to obtain a polylactic acid-based polymer having an optional composition.

Also, in the ring opening polymerization method, a lactide as a cyclic dimer of lactic acid is subjected to ring opening polymerization in the presence of an appropriately selected catalyst, if required, using a polymerization modifier or the like, to thereby obtain a polylactic acid-based polymer. As the lactide, there are mentioned L-lactide as a dimer of L-lactic acid, D-lactide as a dimer of D-lactic acid, and DL-lactide constituted of L-lactic acid and D-lactic acid. These lactides may be mixed with each other according to the requirements and polymerized to obtain a non-crystalline polylactic acid-based polymer having an optional composition.

In the present invention, a small amount of a comonomer component may be added to the non-crystalline polylactic acid-based polymer, if required, for the purpose of improving a heat resistance thereof, etc. Examples of the comonomer component used in the present invention include non-aliphatic dicarboxylic acids such as terephthalic acid, and non-aliphatic diols such as an ethyleneoxide adduct of bisphenol A. In addition, for the purpose of increasing a molecular weight of the obtained polymer, a small amount of a chain extender may be used in the polymerization reaction. Examples of the chain extender include a diisocyanate compound, an epoxy compound and an acid anhydride.

The non-crystalline polylactic acid-based polymer (b) used in the present invention may be in the form of a copolymer with the other hydroxycarboxylic acid unit such as α-hydroxycarboxylic acid or with an aliphatic diol/an aliphatic dicarboxylic acid.

Examples of the other hydroxycarboxylic acid unit include optical isomers of lactic acid (D-lactic acid for L-lactic acid, and L-lactic acid for D-lactic acid), bifunctional aliphatic hydroxycarboxylic acids such as glycolic acid, 3-hydroxybutyric acid, 4-hydroxybutyric acid, 2-hydroxy-n-butyric acid, 2-hydroxy-3,3-dimethyl butyric acid, 2-hydroxy-3-methyl butyric acid, 2-methyl lactic acid and 2-hydroxycaproic acid, and lactones such as caprolactone, butyrolactone and valerolactone.

Examples of the aliphatic diols that may be copolymerized with the above polylactic acid-based polymer include ethylene glycol, 1,4-butanediol and 1,4-cyclohexane dimethanol.

Examples of the aliphatic dicarboxylic acids include succinic acid, adipic acid, suberic acid, sebacic acid and dodecanedioic acid.

The mass-average molecular weight of the non-crystalline polylactic acid-based polymer (b) is preferably from 60,000 to 700,000, more preferably from 60,000 to 400,000 and still more preferably from 60,000 to 300,000. When the mass-average molecular weight of the non-crystalline polylactic acid-based polymer (b) lies within the above-specified range, the resulting composition can be enhanced in practical physical properties such as mechanical properties and heat resistance, and can be improved in moldability or processability since a melt-viscosity thereof is prevented from excessively increasing.

The non-crystalline polylactic acid-based polymer (b) used in the present invention contains L-lactic acid and D-lactic acid as a repeating unit. The content of each of L-lactic acid and D-lactic acid in the non-crystalline polylactic acid-based polymer (b) is preferably 94 mol % or less and more preferably 92 mol % or less. When the content of each of L-lactic acid and D-lactic acid in the non-crystalline polylactic acid-based polymer (b) lies within the above-specified range, the polylactic acid-based polymer has no crystallizability, so that the resulting biodegradable resin composition can be enhanced in dispersibility of the polymer thererin as well as moldability and physical properties.

The method of mixing the composition (A) and the non-crystalline polylactic acid-based polymer (b) is not particularly limited. The composition (A) and the non-crystalline polylactic acid-based polymer (b) may be mixed with each other using an extruder ordinarily used for mixing a thermoplastic resin. Meanwhile, although these components may be mixed and kneaded prior to molding, it is preferred from the viewpoint of costs that pellets of the respective components are mixed upon molding, and melted and mixed in a molding machine.

<Mass Ratio between Composition (A) and Non-Crystalline Polylactic Acid-Based Polymer (b)>

The mass ratio of the composition (A) to the non-crystalline polylactic acid-based polymer (b) (A/b) in the biodegradable resin composition of the present invention is from 95/5 to 50/50. When the proportion of the non-crystalline polylactic acid-based polymer (b) is less than 5, the resulting composition tends to have an excessively high biodegradation rate and tends to be deteriorated in film properties (Young's modulus). On the other hand, when the proportion of the non-crystalline polylactic acid-based polymer (b) is more than 50, production costs tend to be increased, and the resulting composition tends to have an excessively low biodegradation rate and suffer from promoted deterioration in properties owing to hydrolysis, and further tends to be deteriorated in moldability upon producing a biodegradable film therefrom, resulting in poor tear strength and poor tensile elongation at break of the resulting film. From these viewpoints, the mass ratio (A/b) is preferably from 90/10 to 50/50.

[Biodegradable Film]

The biodegradable film according to the present invention is obtained using the aforementioned biodegradable resin composition according to the present invention, and has an adequate biodegradation rate and therefore can be suitably used as a composting bag, an agricultural film and a packaging material, etc.

The biodegradable film according to the present invention may be produced, for example, by the following method. That is, the gelatinized oxidized starch and the biodegradable resin are melted and mixed in an extruder to prepare the composition (a), and further the non-crystalline polylactic acid-based polymer (b) is added to the extruder through a side feed port thereof to prepare the biodegradable resin composition. Next, an outlet of the extruder is connected to a die used in a known water-cooling or air-cooling inflation molding machine or a die used in a T-die film forming machine to continuously produce the biodegradable film. Further, after forming the biodegradable resin composition into pellets or flakes, the pellets or flakes may be molded using the known water-cooling or air-cooling inflation molding machine or the T-die film forming machine to produce the biodegradable film.

In addition, the biodegradable film according to the present invention may also contain various additives ordinarily used in the art, if required, unless addition of the additives adversely affects advantages or effects of the present invention. Examples of the additives include an antioxidant, a thermal stabilizer, an ultraviolet absorber, an antistatic agent, a flame retardant, a crystallization promoter and a filler.

Specific examples of the antioxidant include hindered phenol-based antioxidants such as p-t-butyl hydroxytoluene and p-t-butyl hydroxyanisole.

Specific examples of the thermal stabilizer include triphenyl phosphite and tris(nonylphenyl)phosphite.

Specific examples of the ultraviolet absorber include p-t-butyl phenyl salicylate, 2-hydroxy-4-methoxybenzophenone, 2-hydroxy-4-methoxy-2'-caboxybenzophenone and 2,4,5-trihydroxybutyrophenone.

Specific examples of the antistatic agent include N,N-bis (hydroxyethyl)alkylamines, alkyl amines, alkylaryl sulfonates and alkyl sulfonates.

Specific examples of the flame retardant include hexabromocyclododecane, tris-(2,3-dichloropropyl)phosphate and pentabromophenyl allyl ether.

Specific examples of the crystallization promoter include talc, boron nitride, polyethylene terephthalate and poly (trans-cyclohexane dimethanol)terephthalate.

Specific examples of the filler include inorganic fillers such as clay, talc and calcium carbonate, and organic fillers such as a cellulose powder, a cotton meal and a wood meal.

As described above, in the case where the biodegradable resin composition thus produced is not successively and continuously formed into a film but once formed into pellets or flakes before forming the composition into a film, the set temperature of the inflation molding machine or the T-die film forming machine is the same as that used in the above second step, more specifically, from about 130 to about 180° C. and preferably from 145 to 170° C.

The biodegradable film according to the present invention may be in the form of a stretched film obtained by mono-axially or biaxially drawing the above film.

The biodegradable resin composition according to the present invention is improved in moldability when forming the composition into a film and therefore the biodegradable film can be produced with a high productivity. Further, the resulting biodegradable film is improved in mechanical properties, in particular, impact strength, and therefore can be suitably used as a composting bag, an agricultural film and a packaging material, etc., which can exhibit a biodegradability. In addition, since the biodegradable resin composition and biodegradable film can be well-control in biodegradation rate and hydrolysis rate, it is possible to rapidly meet the requirements according to the conditions upon use at low costs.

EXAMPLES

The present invention will be described in more detail below by referring to the following Examples and Comparative Examples. It should be noted, however, that the following Examples and Comparative Examples are only illustrative and not intended to limit the invention thereto.

Examples 1 to 8 and Comparative Examples 1 to 4

The composition (a) containing the starch (a1) and the biodegradable resin (a2) and the non-crystalline polylactic acid-based polymer (b), etc., were compounded in such amounts and ratios as shown in Table 1, and the following procedure was carried out to produce a biodegradable film. Meanwhile, the amounts and ratios of the components compounded as shown in Table 1 represent "part(s) by mass" and "mass ratios", respectively.

In Comparative Examples 2 and 3, the crystalline polylactic acid-based polymer was used in place of the non-crystalline polylactic acid-based polymer. Meanwhile, the composition (a) used in each of the following Examples and Comparative Examples was a composition containing the whole components other than the polylactic acid-based polymer. Namely, in Examples 1 to 8 and Comparative Examples 1 and 4, the composition (a) is identical to the composition (A), whereas in Comparative Examples 2 and 3, the composition (a) is a composition obtained by removing the crystalline polylactic acid-based polymer from the composition (A).

<Procedure for Production of Biodegradable Film>

The raw materials other than the polylactic acid-based polymer, additives, etc., were mixed using a Super-Mixer, and melted and kneaded using a co-rotation twin-screw extruder having a screw diameter of 80 mm (screw L/D ratio=32) equipped with a dehydration vent to obtain pellets of a composition (a). The set temperature of the first step was from 80 to 140° C., and the set temperature of the second step was from 150 to 180° C. The residence time of the first step was from 60 to 90 s, and the residence time of the second step was from 60 to 90 s.

The pellets of the composition (a) were dried in a dehumidification air-circulation dryer at 70° C. for 3 h. The thus dried pellets of the composition (a) were dry-blended with pellets of the polylactic acid-based polymer, and the resulting blended mixture was molded into a film having a thickness of 30 μm and a lay-flat width of 300 mm (corresponding to a blow-up ratio of 3) using an inflation molding machine available from Yoshii Tekko Co., Ltd. The molding temperature was adjusted to 165° C.

Meanwhile, the amount of water compounded as shown in Table 1 was an amount of water added upon mixing the composition (a). The content of water in the dried pellets was adjusted to about 0.3% by mass.

<Raw Materials Used>

(1) Starch (a1-1)
Oxidized starch "AcE-A" available from Oji Cornstarch Co., Ltd.;
Degree of substitution of carboxyl groups: 0.01;
Viscosity: 300±50 BU
(Brabender viscosity as measured at a concentration of 20% by mass after held at 50° C. for 1 h)
Water content: 12% by mass (as measured by normal pressure heating method at 105° C. for 4 h)

(2) Starch (a1-2)
Corn starch (raw starch) available from Oji Cornstarch Co., Ltd.;
Degree of substitution of carboxyl groups: 0;
Viscosity: 1100±50 BU
(Brabender viscosity as measured at a concentration of 8% by mass after held at 50° C. for 1 h)
Water content: 12% by mass (as measured by normal pressure heating method at 105° C. for 4 h)

(3) Starch (a1-3)
Oxidized starch "AcE-C" available from Oji Cornstarch Co., Ltd.;
Degree of substitution of carboxyl groups: 0.03;
Viscosity: 200±50 BU
(Brabender viscosity as measured at a concentration of 30% by mass after held at 50° C. for 1 h)
Water content: 12% by mass (as measured by normal pressure heating method at 105° C. for 4 h)

(4) Biodegradable Resin (a2-1)
Dehydration condensation-type aliphatic polyester "Bionolle 5001MD" available from Showa Denko K.K. (melting point: 80° C.; MFR: 1.2 g/10 min) (monomers: butanediol, succinic acid and adipic acid)

(5) Biodegradable Resin (a2-2)
Dehydration condensation-type aliphatic polyester "Bionolle 3001MD" available from Showa Denko K.K. (melting point: 95° C.; MFR: 1.2 g/10 min) (monomers: butanediol, succinic acid and adipic acid)

(6) Biodegradable Resin (a2-3)
Dehydration condensation-type aliphatic aromatic polyester "Ecoflex" available from BASF (melting point: 120° C.; MFR: 4.0 g/10 min) (monomers: butanediol, terephthalic acid and adipic acid)

(7) Non-Crystalline Polylactic Acid-Based Polymer (b-1)
Polylactic acid-based polymer "Ingio 4060D" available from Nature Works LLC (melting point: none; MFR: 6.0 g/10 min); L-lactic acid content: 88 mol %; D-lactic acid content: 12 mol %

(8) Crystalline Polylactic Acid-Based Polymer (z-1)
Polylactic acid-based polymer "Ingio 4032D" available from Nature Works LLC (melting point: 160° C.; MFR: 3.7 g/10 min); L-lactic acid content: 98.6 mol %; D-lactic acid content: 1.4 mol %

(9) Crystalline Polylactic Acid-Based Polymer (z-2)
Polylactic acid-based polymer "Ingio 2002D" available from Nature Works LLC (melting point: 150° C.; MFR: 2.6 g/10 min); L-lactic acid content: 95.7 mol %; D-lactic acid content: 4.3 mol %

(10) Water: Deionized Water
(11) High-Boiling Point Solvent: Glycerin
(12) Plasticizer (p-1)
Polyglycerin acetic acid ester "RIKEMAL PL-710" available from Riken Vitamin Co., Ltd.

(13) Plasticizer (p-2)
Adipic acid diester "ADEKA CIZER RS-107" available from Adeka Corp.

Meanwhile, the melting points of the components (4) to (9) were measured by melting each component at 190° C. by DSC and cooing the molten component to 20° C. at a temperature drop rate of 10° C./min, and further heating the component at a temperature rise rate of 10° C./min. The measurement was conducted at a temperature of 190° C. under a load of 21.18 N according to JIS K7210.

Also, the contents of the L-isomer and D-isomer of the polylactic acid-based polymer in the biodegradable resin composition were measured by the following method.

That is, 0.3 g of the resin composition was weighed and mixed with 6 mL of a 1N potassium hydroxide/methanol solution, and the resulting mixture was fully stirred at 65° C. Next, 450 μL of sulfuric acid were added to the mixture, and then the obtained mixed solution was stirred at 65° C. to decompose the polylactic acid-based polymer and weigh 5 mL of the resulting reaction solution as a sample. The sample was mixed with 3 mL of pure water and 13 mL of methylene chloride, and the obtained mixture was shaken and mixed together. The resulting reaction solution was allowed to stand and separated into layers, and about 1.5 mL of a lower organic layer thus separated was sampled, filtered using a disk filter for HPLC having a pore diameter of 0.45 μm, and then subjected to gas chromatography using a GC system "HP-6890 Series" available from Hewlett Packard Co. The proportion (%) of a peak area of D-lactic acid methyl ester to a whole peak area of lactic acid methyl esters was calculated as a content (mol %) of a D-isomer in the polylactic acid-based polymer resin, and a content (mol %) of an L-isomer in the polylactic acid-based polymer resin was calculated based on the content of the D-isomer.

<Evaluation Methods>

(Film-Forming Property)

The film-forming property was evaluated according to the following three ratings.

◯: Bubble was stabilized, and a film having a desired size was produced;

Δ: Bubble was unstable, and it was not possible to prepare a film having a desired size; and X: Bubble was not formed or punctured, and it was not possible to mold the resin composition into a film.

(Film Properties)

The obtained films were measured for their tensile strength at break, tensile elongation at break, Young's modulus, impact strength, heat seal strength and tear strength, and the measurement results were evaluated according to the following four ratings.

◎: All of requirements including a tensile strength at break of 20 MPa or more, a tensile elongation at break of 100% or more, a Young's modulus of 250 MPa or more, an impact strength of 30 kJ/m or more, a heat seal strength of 6 N/15 mm or more, and a tear strength of 8 N/mm or more, were satisfied;

◯: Any one of the above requirements was unsatisfied;

Δ: Any two of the above requirements were unsatisfied; and

X: Any three or more of the above requirements were unsatisfied.

Any of the mechanical properties other than the impact strength and heat seal strength was measured in both of a longitudinal direction (film take-up direction; MD) and a lateral direction (TD) of the film, and examined whether or not the film satisfied the above requirements in both the directions. The heat seal strength of the film was measured in the longitudinal direction only, and evaluated based on the measured value.

Meanwhile, the mechanical properties of the film were measured only when the film-forming property thereof was evaluated as being ◯ or Δ, and therefore the film was actually formed.

The methods for measuring the respective mechanical properties were as follows.

Tensile strength at break: Measured according to JIS Z-1702.

Tensile elongation at break: Measured according to JIS Z-1702.

Young's modulus: Measured according to ASTM D-822.

Impact strength: Measured according to JIS P-8143.

Heat seal strength: Measured according to JIS Z-0238.

Tear strength: Measured using a pendulum Elmendorf tearing tester available from Toyo Seiki Seisaku-Sho Ltd., according to JIS P-8116. The tear strength was defined as the value calculated by dividing the above tear strength (N) measured according to JIS P-8116 by a thickness (mm) of the film.

(Biodegradation Rate (Biodegradability))

The film having a width of 30 mm, a length of 90 mm and a thickness of 30 μm was buried in compost filled in a plastic container. The thus filled plastic container was allowed to stand in an oven at 40° C. for 10 days, and then a mass loss of the film was measured to evaluate properties of the film in view of a performance required for agricultural mulch films according to the following four ratings. Meanwhile, when the biodegradation rate of the film was considerably fast as compared to a period of service thereof, the film suffered from problems such as tearing and scattering, etc., whereas when the biodegradation rate of the film was considerably slow as compared to a period of service thereof, there occurred such a problem that the film still remained in a non-decomposed state even by plowing.

◎: Mass loss of the film was not less than 10% and less than 30%;

◯: Mass loss of the film was not less than 30% and less than 60%;

Δ: Mass loss of the film was not less than 60% and less than 80%; and

X: Mass loss of the film was not less than 80% or less than 10%.

(Hydrolysis Rate (Hydrolysis Resistance))

Each film sample was placed in a thermo-hygrostat at 60° C. and 95% RH and allowed to stand therein for 1 week, and then subjected to tensile test to determine a retention rate of an MD tensile elongation at break of the film sample relative to an initial value thereof (as a property immediately after molding). The hydrolysis rate (hydrolysis resistance) of the film was evaluated based on the thus measured retention rate according to the following three ratings.

◯: Retention rate after 1 week was not less than 80%;

Δ: Retention rate after 1 week was not less than 50% but less than 80%; and

X: Retention rate after 1 week was less than 50%.

The respective evaluation results are shown in Table 1.

TABLE 1-1

| | Composition (a) (amount compounded: part(s) by mass) | | | | | | | | |
|---|---|---|---|---|---|---|---|---|---|
| | Starch (a1) | | Biodegradable resin (a2) | | (a1)/(a2) [mass ratio] | (a1)/(a2) [mass ratio] (after drying) | Amount of water added | Amount of high-boiling point solvent added | Plasticizer (p) | |
| | Kind | Amount added | Kind | Amount added | | | | | Kind | Amount added |
| Example 1 | a1-1 | 40 | a2-1 | 47 | 46/54 | 43/57 | 7 | 3 | p-1 | 3 |
| Example 2 | a1-1 | 40 | a2-1 | 47 | 46/54 | 43/57 | 7 | 3 | p-1 | 3 |
| Example 3 | a1-1 | 43 | a2-1 | 44 | 49/51 | 46/54 | 7 | 3 | p-1 | 3 |
| Example 4 | a1-1 | 30 | a2-1 | 57 | 34/66 | 32/68 | 7 | 4 | p-2 | 3 |
| Example 5 | a1-1 | 40 | a2-2 | 47 | 46/54 | 43/57 | 7 | 4 | p-1 | 3 |
| Example 6 | a1-1 | 40 | a2-3 | 47 | 46/54 | 43/57 | 7 | 4 | p-1 | 3 |
| Example 7 | a1-3 | 40 | a2-1 | 47 | 46/54 | 43/57 | 7 | 4 | p-1 | 3 |
| Example 8 | a1-2 | 30 | a2-1 | 61 | 33/67 | 30/70 | 7 | 3 | p-1 | 3 |
| Comparative Example 1 | a1-1 | 40 | a2-1 | 47 | 46/54 | 43/57 | 7 | 3 | p-1 | 3 |
| Comparative Example 2 | a1-1 | 40 | a2-1 | 47 | 46/54 | 43/57 | 7 | 3 | p-1 | 3 |
| Comparative Example 3 | a1-1 | 40 | a2-1 | 47 | 46/54 | 43/57 | 7 | 3 | p-1 | 3 |
| Comparative Example 4 | a1-1 | 40 | a2-1 | 47 | 46/54 | 43/57 | 7 | 3 | p-1 | 3 |

TABLE 1-2

| | Polylactic acid-based polymer | | Biodegradable resin composition [pars(s) by mass] | | Evaluation | | | |
|---|---|---|---|---|---|---|---|---|
| | Crystalline/non-crystalline | Kind | Composition (a) | Polylactic acid-based polymer | Film-forming property | Film properties | Bio-degradation rate | Hydrolysis rate |
| Example 1 | Non-crystalline | b-1 | 90 | 10 | ○ | ◎ | ◎ | ○ |
| Example 2 | Non-crystalline | b-1 | 60 | 40 | Δ | ◎ | ◎ | ○ |
| Example 3 | Non-crystalline | b-1 | 75 | 25 | ○ | ◎ | ◎ | ○ |
| Example 4 | Non-crystalline | b-1 | 75 | 25 | ○ | ◎ | ◎ | ○ |
| Example 5 | Non-crystalline | b-1 | 75 | 25 | ○ | ○ | ◎ | ○ |
| Example 6 | Non-crystalline | b-1 | 75 | 25 | ○ | ◎ | ○ | ○ |
| Example 7 | Non-crystalline | b-1 | 75 | 25 | ○ | ◎ | ◎ | ○ |
| Example 8 | Non-crystalline | b-1 | 75 | 25 | Δ | ○ | ◎ | ○ |
| Comparative Example 1 | — | — | 100 | 0 | ○ | ○ | X | ○ |
| Comparative Example 2 | Crystalline | z-1 | 75 | 25 | ○ | X | ○ | ○ |
| Comparative Example 3 | Crystalline | z-2 | 75 | 25 | ○ | X | ○ | ○ |
| Comparative Example 4 | Non-crystalline | b-1 | 40 | 60 | X | — | — | — |

From the results shown in Table 1, it was confirmed that the biodegradable resin compositions and the biodegradable films obtained according to the present invention were excellent in film-forming property and mechanical strength as well as bag-making suitability such as heat-sealing property and economy as compared to those obtained in Comparative Examples, and further exhibited an adequate biodegradation rate.

INDUSTRIAL APPLICABILITY

The biodegradable resin composition and the biodegradable film according to the present invention can exhibit adequate biodegradation rate and hydrolysis rate. In addition, the biodegradable film according to the present invention can exhibit a high tear strength, in particular, in a machine (stretch) direction of the film and therefore can be suitably used as a composting bag, an agricultural film and a packaging material, etc.

The invention claimed is:
1. A biodegradable resin composition comprising:
   (a1) a starch,
   (a2) a biodegradable resin other than a polylactic acid-based polymer,
   (b) a non-crystalline polylactic acid-based polymer, and
   (c) optionally one or more other components,
   a mass ratio of (a1) the starch to (a2) the biodegradable resin other than a polylactic acid-based polymer (a1/a2) being from 20/80 to 50/50, and
   a mass ratio of a sum of all components other than the polymer (b) to the polymer (b) (sum of components other than polymer (b)/polymer (b)) being from 95/5 to 50/50.

2. The biodegradable resin composition according to claim 1, wherein the starch (a1) is an oxidized starch having a structure represented by the general formula (I):

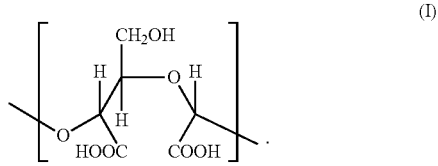

3. The biodegradable resin composition according to claim 1, wherein the biodegradable resin (a2) is a condensation polymer of ethylene glycol and/or 1,4-butanediol, and succinic acid and/or adipic acid.

4. The biodegradable resin composition according to claim 1, wherein the non-crystalline polylactic acid-based polymer (b) is a polymer of L-lactic acid and D-lactic acid, and a content of the L-lactic acid and a content of the D-lactic acid in the polymer are respectively 94 mol % or less.

5. The biodegradable resin composition according to claim 1, further comprising a high-boiling point solvent, wherein the high-boiling point solvent has a boiling point of 180° C. or higher as measured at 1 atm.

6. The biodegradable resin composition according to claim 1, further comprising a plasticizer.

7. The biodegradable resin composition according to claim 6, wherein the plasticizer is at least one compound selected from the group consisting of polyglycerin acetic acid ester and derivatives thereof, and adipic acid diesters.

8. The biodegradable resin composition according to claim 1, wherein the biodegradable resin composition is produced by melt-kneading the components other than the polymer (b) in a vented extruder, and then adding the polymer (b) to the components thus kneaded.

9. A biodegradable film comprising the biodegradable resin composition as defined in claim 1.

10. The biodegradable resin composition according to claim 2, wherein the biodegradable resin (a2) is a condensation polymer of ethylene glycol and/or 1,4-butanediol, and succinic acid and/or adipic acid.

* * * * *